Patented Dec. 6, 1938

2,139,472

UNITED STATES PATENT OFFICE 2,139,472

AZO DYESTUFFS

Friedrich Schubert, Leverkusen, Germany, assignor to General Aniline Works, Inc., New York, N. Y., a corporation of Delaware No Drawing. Application September 11, 1936, Serial No. 100,317. In Germany October 25, 1935

7 Claims. (Cl. 260—144)

The present invention relates to poly-azodyestuffs, more particularly it relates to dyestuffs which may be represented by the general formula:

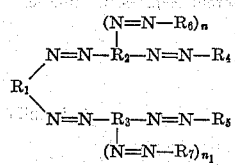

In the said formula $R_1$ stands for the radical of a diazotization component, such as for a radical of the benzene-, naphthalene-, diphenyl-, diphenylurea- and diphenylamine-series, $R_2$ and $R_3$ stand for radicals of coupling components capable of being coupled at least twice with diazo compounds, such as for the radical of resorcinol, meta-aminophenol, meta-phenylenediamine, or suitable substitution products thereof, $R_4$, $R_5$, $R_6$ and $R_7$ stand for radicals of the same or different diazotization components, for example of the benzene or naphthalene series, and $n$ and $n_1$ stand for zero or the number 1.

My new dyestuffs are obtainable by coupling 1 molecular proportion of a diazo compound containing a group which is convertible into an amino group, such as the nitro group or the acylamino group, with 1 molecular proportion of the above mentioned coupling components $R_2$ or $R_3$ respectively, then converting into the amino group the group above specified, subsequently diazotizing, combining with 1 molecular proportion of the above coupling components $R_3$ or $R_2$ respectively, and finally coupling upon each of the coupling components $R_2$ and $R_3$ with one or two molecular proportions respectively of the same or different diazo compounds.

Those dyestuffs of the above identified general formula, in which $R_1$ stands for a radical of the diphenyl series, such as benzidine, benzidine-disulfonic acid, diaminodiphenyl-urea, diamine diphenyl-urea disulfonic acid, diaminodiphenyl-amine, diaminodistilbene disulfonic acid and the like, also can be built up by starting with the corresponding diaminodiphenyl compounds, tetrazotizing the same, simultaneously or successively, combining with the coupling components $R_2$ and $R_3$, and finally coupling upon the intermediate product the diazo compounds $R_4$, $R_5$, $R_6$ and $R_7$, respectively.

The dyestuffs thus obtained are particularly suitable for dyeing leather and are distinguished by yielding intense generally brown shades of good fastness to acids and alkalies.

The invention is illustrated by the following examples:

Example 1

A solution of 220 kgs. of resorcinol is introduced into a tetrazotization solution prepared from 344 kgs. of 4.4'-diaminodiphenyl-2.2'-disulfonic acid. After stirring for a short time, a solution of about 418 kgs. of sodium acetate is added, and the whole is stirred until coupling is complete. The coupling mixture is now rendered distinctly alkaline with sodium carbonate, and a diazo solution prepared from 418 kgs. of para-sulfanilic acid (dihydrate) is added thereto. After this coupling is complete, the dyestuff, which coresponds in its free state to the following formula:

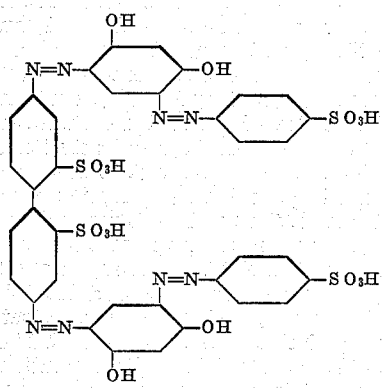

is salted out with about 10% of the volume of common salt and pressed.

The dyestuff when dried forms a grey powder, which dissolves in water with a brown, in sulfuric acid with a dark brown coloration and dyes leather full brown, subdued shades of good fastness to acids.

Example 2

There are added to the tetrakisazodyestuff from 1 molecular proportion of tetrazotized 4.4'- diaminodiphenyl-2.2'-disulfonic acid, 2 molecular proportions of resorcinol and 2 molecular proportions of para-sulfanilic acid, prepared as described in Example 1, after coupling with para-sulfanilic acid and after adding a solution of about 70 kgs. of sodium carbonate, further a diazo solution prepared from 418 kgs. of para-sulfanilic acid (dihydrate), and the whole is stirred until coupling is complete, the reaction being alkaline with caustic soda or sodium carbonate. The finished dyestuff, which corresponds in its free state to the following formula:

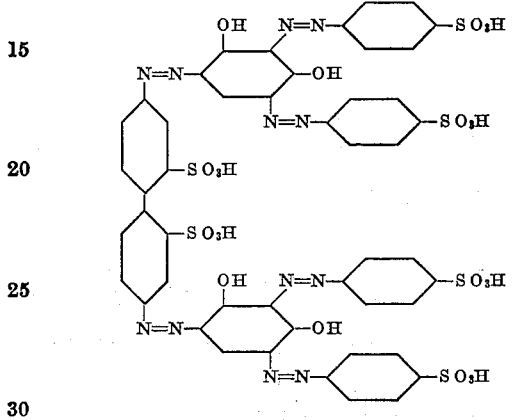

is salted out with about 15–20% of the whole volume of common salt and pressed.

The dyestuff dissolves in water with a yellowish brown and in sulfuric acid with a brownish violet coloration. It dyes leather a more subdued brown shade than that obtained with the dyestuff of Example 1, the dyeings having the same fastness to acids and alum.

*Example 3*

138 kgs. of para-nitraniline are diazotized in the known manner and coupled, in an acid medium, with 110 kgs. of resorcinol. When the coupling of this monoazo dyestuff is complete, 209 kgs. of para-sulfanilic acid are diazotized and added, and coupling is effected in a medium alkaline with sodium carbonate. After this coupling is complete, a solution of about 420 kgs. of sodium sulfide is added to the dyestuff, and the whole is stirred until the reduction is complete. This reduction mixture is rendered acid to Congo with hydrochloric acid, and the dyestuff thereby separated is squeezed off and, for removing the sulfur, dissolved in a hot aqueous solution of sodium carbonate and filtered. After cooling, there is added to the filtrate a solution of 70 kgs. of sodium nitrite, the mixture is rendered acid to Congo at a low temperature, and stirred until diazotization is complete. Thereupon a solution of 110 kgs. of resorcinol is poured into the diazotization mixture, and coupling is effected in a medium alkaline with sodium carbonate. When coupling is complete, a diazo solution prepared from 218 kgs. of 4-nitraniline-2-sulfonic acid is added to the coupling mixture, which latter component has disappeared after a short time. After a solution of about 350 kgs. of sodium carbonate in 1400 litres of water has been added, there is finally added a diazo solution prepared from 138 kgs. of para-nitraniline. Coupling is complete over night. The next day the dyestuff is salted out with about 10% of sodium chloride while at the same time adding hydrochloric acid until there is a weakly alkaline reaction, and then squeezed.

The dyestuff corresponds in its free state to the following formula:

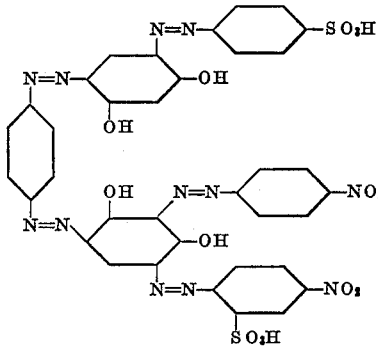

and yields on leather brown shades of good fastness properties.

In the following table there are given further combinations prepared in accordance with the invention. All the dyestuffs mentioned therein are suitable for dyeing leather, yielding brown shades.

The arrow (←) means diazotized and coupled with.

1.   N=N—resorcinol←para-sulfanilic acid
     ⟨benzene ring⟩
                                              4-nitraniline-2-sulfonic acid
     N=N—meta-aminophenol ⤹
                                              4-nitraniline 2.   N=N—resorcinol←para-sulfanilic acid
     ⟨benzene ring⟩
                                              4-nitraniline-2-sulfonic acid
     N=N—resorcinol ⤹
                                              4-nitraniline-2-sulfonic acid 3.   ⟨benzene ring⟩—N=N—resorcinol←para-sulfanilic acid
                                              4-nitraniline-2-sulfonic acid
     N=N—resorcinol ⤹
                                              4-nitraniline 4.   ⟨benzene ring⟩—N=N—resorcinol←para-sulfanilic acid
                                              4-nitraniline-2-sulfonic acid
     N=N—resorcinol ⤹
                                              4-nitraniline-2-sulfonic acid 5.                                            4-nitraniline-2-sulfonic acid
     N=N—resorcinol ⤹
                                              4-nitraniline
     SO₃H—⟨benzene ring⟩
                                              4-nitraniline-2-sulfonic acid
     N=N—resorcinol ⤹
                                              4-nitraniline

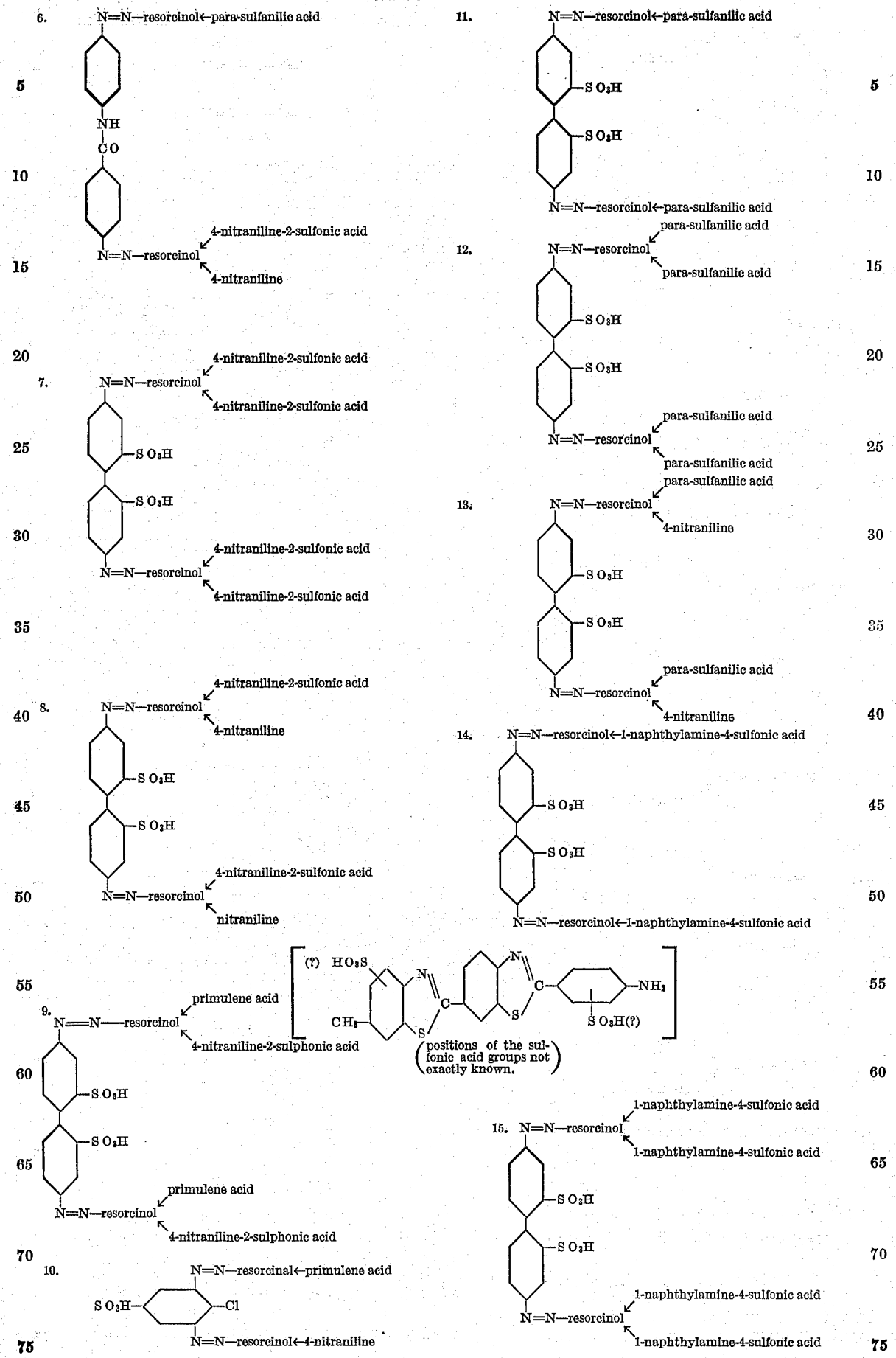

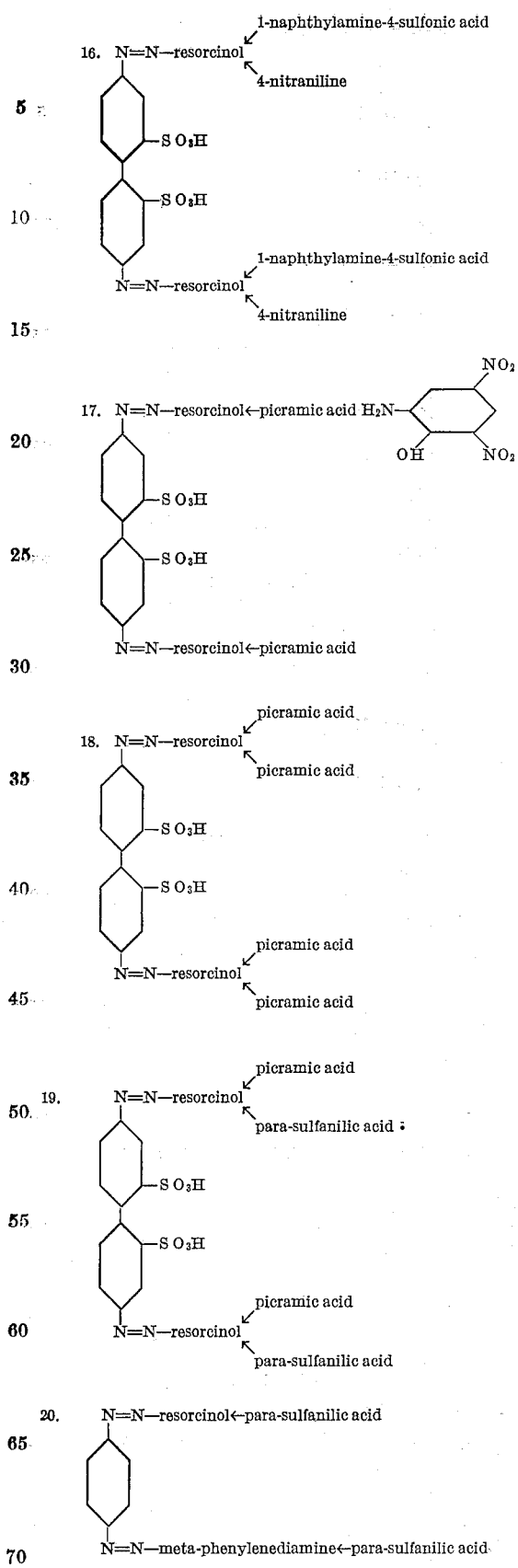

The term "monocyclic aryl radicals" used herein is meant to include the phenyl radical and such derivatives thereof as do not contain more than one ring member.

I claim:

1. Poly-azodyestuffs of the general formula:

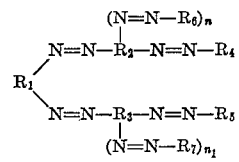

wherein $R_1$ stands for a member of the group consisting of monocyclic aryl radicals, such radicals substituted by benzoyl-amino and such radicals substituted by sulfonated phenyl, $R_2$ and $R_3$ stand for radicals of coupling components capable of being coupled at least twice with diazo compounds, $R_4$, $R_5$, $R_6$, and $R_7$ stand for radicals of diazotization components and $n$ and $n_1$ stand for one of the numbers zero and 1, dyeing leather in general brown shades of good fastness to acids and alkalies.

2. Poly-azodyestuffs of the general formula:

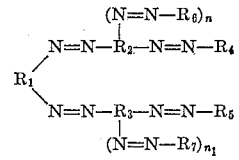

wherein $R_1$ stands for a member selected from the group consisting of monocyclic aryl radicals, such radicals substituted by benzoyl-amino and such radicals substituted by sulfonated phenyl bearing the azo groups in para-position to each other, $R_2$ and $R_3$ stand for radicals of meta-dihydroxy compounds of the benzene series, $R_4$, $R_5$, $R_6$ and $R_7$ stand for radicals of diazotization components and $n$ and $n_1$ stand for one of the numbers zero and 1, dyeing leather in general brown shades of good fastness to acids and alkalies.

3. Poly-azodyestuffs of the general formula:

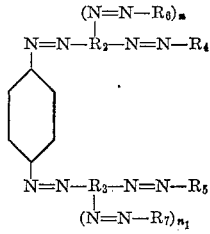

wherein $R_2$ and $R_3$ stand for radicals of meta-dihydroxy compounds of the benzene series, $R_4$, $R_5$, $R_6$ and $R_7$ stand for radicals of diazotization components and $n$ and $n_1$ stand for one of the numbers zero and 1, dyeing leather in general brown shades of good fastness to acids and alkalies.

4. Poly-azodyestuffs of the general formula:

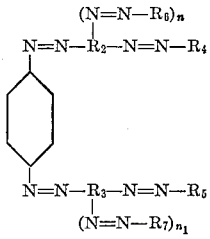

wherein $R_2$ and $R_3$ stand for radicals of meta-dihydroxy compounds of the benzene series, $R_4$, $R_5$, $R_6$ and $R_7$ stand for radicals of the benzene series and $n$ and $n_1$ stand for one of the numbers zero and 1, dyeing leather in general brown shades of good fastness to acids and alkalies.

5. The poly-azodyestuff having in the free state the following formula:

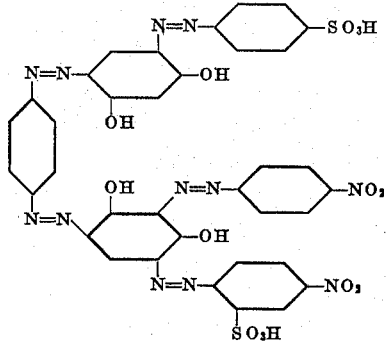

yielding on leather in general brown shades of good fastness properties.

6. The poly-azodyestuff having in the free state the general formula:

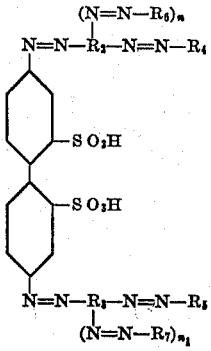

wherein $R_2$ and $R_3$ stand for radicals of meta-dihydroxy compounds of the benzene series, $R_4$, $R_5$, $R_6$ and $R_7$ stand for radicals of diazotization components and $n$ and $n_1$ stand for one of the numbers zero and 1, dyeing leather in general brown shades of good fastness to acids and alkalies.

7. The azodyestuff having in the free state the general formula:

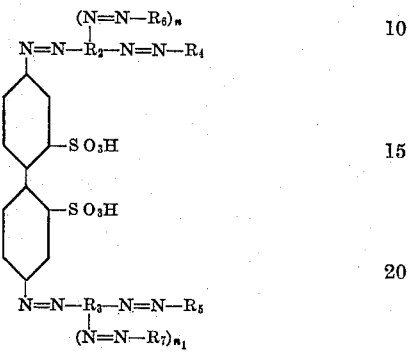

wherein $R_2$ and $R_3$ stand for radicals of meta-dihydroxy compounds of the benzene series, $R_4$, $R_5$, $R_6$ and $R_7$ stand for radicals of the benzene series and $n$ and $n_1$ stand for one of the numbers zero and 1, dyeing leather in general brown shades of good fastness to acids and alkalies.

FRIEDRICH SCHUBERT.